United States Patent [19]
Watson et al.

[11] Patent Number: 5,817,352
[45] Date of Patent: Oct. 6, 1998

[54] METHOD OF SEALING FORAGE PRODUCTS FOR STORAGE

[75] Inventors: Dale G. Watson, Carrollton; George Terhune; David S. McAtee, both of Spickard, all of Mo.

[73] Assignee: The Curators of the University of Missouri, Columbia, Mo.

[21] Appl. No.: 983,173

[22] Filed: Nov. 30, 1992

[51] Int. Cl.$^6$ ............................... A23K 1/00; A23K 3/00
[52] U.S. Cl. ............................. 426/89; 426/99; 426/302; 426/310; 426/608; 426/623; 426/807
[58] Field of Search ................. 426/208, 623, 426/601, 89, 302, 310, 99, 608; 56/1, 341

[56] References Cited

U.S. PATENT DOCUMENTS

| | | | |
|---|---|---|---|
| 2,711,962 | 6/1955 | Bickoff | 99/8 |
| 3,468,667 | 9/1969 | Chandler et al. | 426/807 |
| 3,485,635 | 12/1969 | Fassauer | 99/8 |
| 3,642,488 | 2/1972 | Watchorn et al. | 99/2 |
| 3,726,693 | 4/1973 | Harris | 99/199 |
| 3,806,600 | 4/1974 | Lapore et al. | 424/317 |
| 3,894,314 | 7/1975 | Nayfa | 19/66 R |
| 3,982,028 | 9/1976 | Bellingham | 426/69 |
| 4,019,225 | 4/1977 | Nayfa | 19/66 R |
| 4,205,514 | 6/1980 | Wolrab | 56/341 |
| 4,327,537 | 5/1982 | Wolrab | 56/1 |
| 4,762,724 | 8/1988 | Staker et al. | 426/302 |
| 4,846,890 | 7/1989 | MacFarlane et al. | 106/141 |
| 4,859,480 | 8/1989 | MacFarlane et al. | 426/310 |
| 5,156,870 | 10/1992 | Evans | 426/807 |

FOREIGN PATENT DOCUMENTS 61-104752  5/1986  Japan.

OTHER PUBLICATIONS

Patent Abstracts of Japan: C375. vol. 10, No. 287 (abstract for Japan Kokai 59-223850). published Sep. 30, 1986.
"Beef Tallow Protects Big Bales of Hay", *Missouri Farm News Service,* Dec. 18, 1991, vol. 88, No. 19.
"Soy Coat Wraps Big Bales", *Soybean Digest,* Feb. 1992.
"Beef Tallow Protects Hay in MU Big-Bale Research", *Western Livestock Journal,* Feb. 3, 1992, vol. 71, No. 14.
"Beef Tallow Finds New Use as Hay Perservative", *Successful Farming,* Mar., 1992.
"Beef Fat Protects Big Bales", *Progressive Farmer,* Apr. 1992, 82–83.
"Beef Fat Gets Used to Preserve Hay", *St. Joseph (Mo.) News–Press/Gazette,* Dec. 29, 1991,5B.
"Waste Product Stops Waste", *Missouri Ruralist,* Feb. 8, 1991, 10.
"Cattle Chew the Fat", *Hay & Forage Grower,* Mar. 1992, 22.

*Primary Examiner*—Anthony J. Weier
*Attorney, Agent, or Firm*—Howell & Haferkamp, L.C.

[57] ABSTRACT

A method of storing forage products in a mass includes the steps of coating all of the exposed surfaces of the mass with a melted tallow, and allowing the tallow composition to cool to seal the surface of the mass. The tallow is preferably applied at a rate of between about 0.4 and about 0.8 pounds per square foot of surface area, and penetrates to a depth of between about ¼ and ¾, forming a protective layer or shell with the forage products. The tallow preferably has a titre of between about 47 and about 49.

16 Claims, 2 Drawing Sheets

METHOD OF SEALING FORAGE PRODUCTS FOR STORAGE

FIELD OF THE INVENTION

This invention relates to a method of sealing forage products, such as bales of hay, to protect the forage products during outdoor storage.

BACKGROUND AND SUMMARY OF THE INVENTION

Forage products, such as grassy and leguminous hays, are typically cut and baled in the field. In the past these bales were transported and stored in a barn or shed. The transportation and storage of hay in this manner was labor intensive and therefore costly. Moreover, interest in leaving bales in the field has increased due to use of balers producing large packages of forage. These large packages are more difficult to transport and store. However, the bales must be protected from the damage from the weather and from decomposition. As much as 25 to 30 percent of the hay can be lost to spoilage and degradation unless something is done to protect the hay.

One solution to this problem is to wrap the bales in plastic sheeting or enclose them in plastic bags. However, this use of plastic can be expensive, and the used plastic must be disposed of and is not biodegradable. Moreover the plastic can get tangled in and torn by farm equipment used in and around the bales. Another solution is to coat the bales with a protective coating. For example, Fassauer, U.S. Pat. No. 3,485,635, discloses the use of plastic or wax to form a protective coating over silage in a trench silo. MacFarlane et. al., U.S. Pat. Nos. 4,846,890, and 4,859,480, disclose various compositions for application to cut agricultural products. Wolrab, U.S. Pat. Nos. 4,205,514, and 4,327,537, disclose an apparatus for, and method of, sealing forage packages.

The method of the present invention relates to a method of sealing a bale or other mass of forage products in the field to protect the forage products from the weather and from decomposition. Generally, the method comprises pouring melted tallow on the exposed surfaces of the mass to seal the surface of the mass. The hydrolized tallow preferably has a relatively high titre, most preferably in the range of about 47 to about 49. (Titre is a measure of melting point in °C.). The inventors also believe that it is preferable that the tallow have an iodine value of less than 20. The amount of tallow applied is preferably at least 0.4 pounds per square foot and most preferably between about 0.4 and about 0.8 pounds per square foot, which on a round bale corresponds to between about 1½ and about 2 pounds per 100 pounds of forage material. The tallow penetrates to a depth of between about ½ and about ¾ of an inch, sealing the forage material together, rather than forming a coating on the exterior of the bale. The tallow is preferably applied at a temperature just slightly in excess of its melting temperature.

Bales sealed according to this method demonstrate resistance to moisture, and the forage products are effectively protected against moisture and decomposition. Surprisingly, the tallow coating is not significantly degraded by rain, sunlight, or high atmospheric temperature. Also surprisingly, the tallow coating has not proven to be particularly attractive to insects or other vermin. The tallow does not impair the palatability of the forage products, and may increase the caloric value, thereby reducing the amount of forage material that must be fed. Tallow is a renewable resource; it is a by-product of meat processing, and as fast-food restaurants switch from tallow to vegetable oil for frying, tallow is readily available in large quantities, and is relatively inexpensive. The tallow is readily consumed with the forage products, and thus does not present the disposal problem encountered with plastic sheeting and bags.

These and other features and advantages will be in part apparent and in part pointed out hereinafter.

DETAILED DESCRIPTION OF THE PREFERRED EMBODIMENT

The method of this invention involves the use of tallows to seal the exposed surfaces of a mass of forage product to protect the mass from the weather and from decomposition. Tallow is an animal fat that typically has been hydrolyzed to have a titre (or congealing temperature) of at least 40. Generally, fats with a titre over 40 are considered tallows and fats with a titre of less than 40 are considered grease. According to the method of this invention tallow is melted and poured onto the exposed surfaces of a mass of forage product, and allowed to cool, sealing the surface of the mass.

Figure 1:
FIG. 1 is a photograph of the surface of a bale of hay sealed according to the method of this invention.
Figure 2:
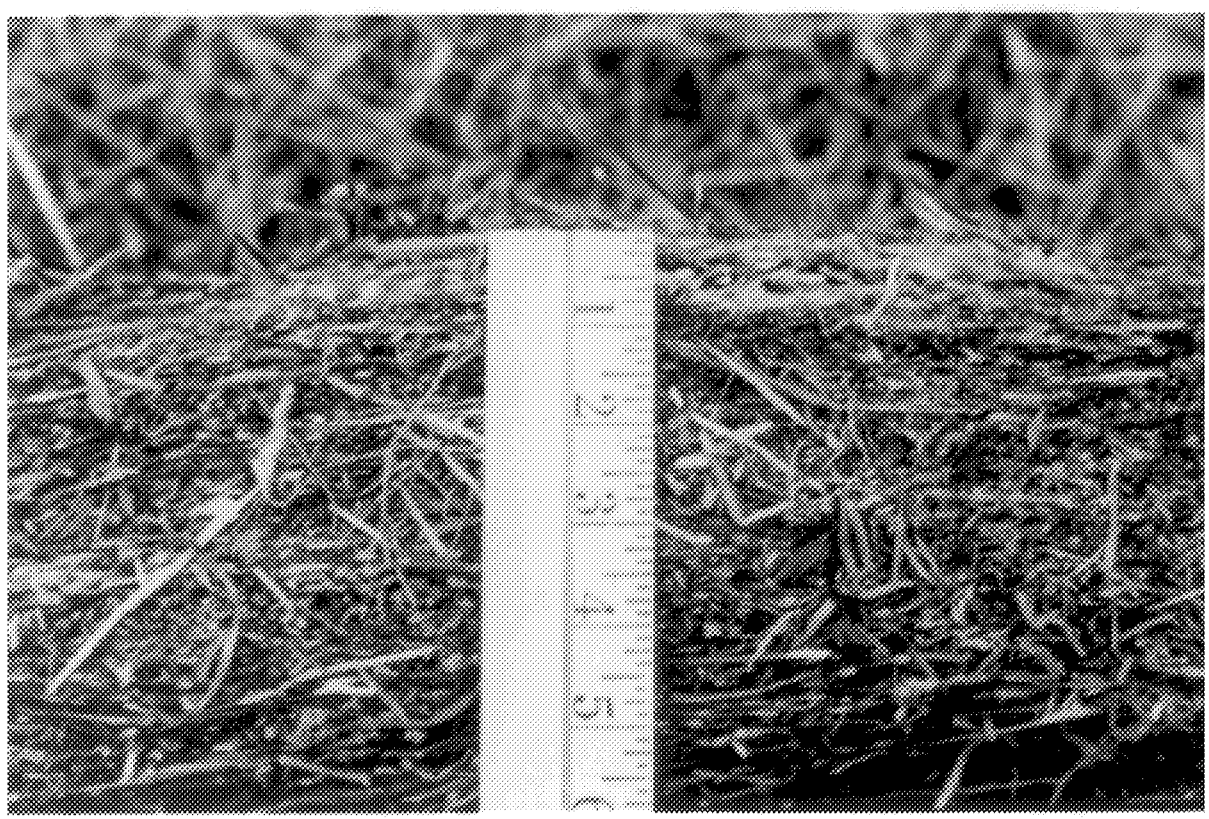
FIG. 2 is a photograph of the cross section of the surface of a bale of hay sealed according to the method of this inventions.

Spraying tallow generally does not work because the tallow cools and has a tendency to solidify before it can penetrate the surface of the mass. The tallow penetrates the surface of the mass, rather than forming a coating on the surface. See FIG. 1. The tallow penetrates to a depth of between about ¼ and about ¾ of an inch, depending upon the density of the forage product, and binds together the individual stalks and stems comprising the forage product, sealing the surface of the mass. See FIG. 2. The tallow is preferably applied to all the surfaces of the mass, including the underside.

The tallow is preferably applied at a temperature just slightly in excess of its melting temperature. This allows the tallow to solidify quickly, minimizes the depth of penetration into the forage product. Also, maintaining a low tallow temperature reduces risk of injury to the persons sealing the forage product.

The tallow is preferably beef tallow, which has a relatively high melting point, and is preferably at least partially hydrogenated to increase its titre to between about 47 and about 49. Of course some other tallow other than beef tallow could be used, or the tallow could be a mixture of tallows. The tallow preferably has an iodine value of less than 20.

The tallow is simply melted and applied to the surface of the forage product by pouring, for example from a sprinkling can. Of course, a special apparatus could be constructed to facilitate the melting and pouring of the tallow. This might allow for more accurate control of the tallow temperature, allowing the tallow to be heated closer to its melting point.

The tallow is preferably applied on the surface in an amount of at least 0.4 pounds per square foot, and most preferably about 0.8 pounds per square foot. For a round bale, this is roughly equivalent to about 1½ and about 2 pounds per 100 pounds of forage product. The precise amount of tallow required for an effective seal depends upon the nature of the forage product, and its compaction. Leguminous hays generally require a greater amount of tallow than grassy hays.

The forage product is preferably in the form of a bale that has been laced with twine to maintain its structural integrity. The method has been found to work well with a twine spacing of about 4 inches. The density helps to form the protective layer, and thus the sealing method works best with bales, particularly those that are tightly wrapped. While described in terms of bales of hay, the method of this invention is not so limited, and could be used to seal forage product in a trench silo or in a stack. However, the compression of the forage product that results when the forage product is formed into a bale facilitates the formation of the protective layer or shell. The density of the bale also facilitates the formation of the protective layer, and the density of the bale is preferably at least about 10 lbs./ft.$^3$, and more preferably about 14–17 lbs./ft.$^3$.

While the protective layer or shell formed by the forage products and the tallow protects the interior from moisture, it appears to continue to allow the bale to breathe. No mold accumulation or spoilage has been observed in bales properly sealed with tallow.

OPERATION

In operation, hay or other forage products are cut and baled, and preferably laced with twine to maintain their structural integrity. Tallow, preferably having a titre of between about 47 and 49 is melted and poured onto the surface of the bale. The tallow is applied at a rate of about 0.4 and about 0.8 pounds per square foot of surface area. The tallow penetrates to a depth of about ¼ and ¾ inches before hardening, sealing the stems and stalks of the forage product together, forming a protective shell at the surface of the bale. All the exposed surfaces, and preferably all the surface of the bale is treated in this manner. The bale can be treated at the time the bale is formed, or the bales can be treated later. The sealing helps maintain the moisture content of the hay within the desired range. Excessive moisture content causes molding and heating.

EXAMPLE 1

Hay bales weighing between 1710 and 1850 pounds were sealed with a tallow having a titre of between about 40 and about 42 and with a tallow having a titre of between about 47 and about 49. The tallow was applied at a rate of about 1½ pounds per 100 pounds of hay. The bales were left outside for eight months, during which time 36.01 inches of precipitation fell. At the end of eight months the bales were checked. The bales sealed with the tallow having a titre of between about 40 and about 42 had turned black. Moisture had penetrated at least 6–8 inches and the outside layer was mucky and decomposed. The bales sealed with the tallow having a titre of between about 47 and about 49 retained their color. Inside the hay was dry and green and fresh.

What is claimed is:

1. A method of storing forage product in a mass having exposed surfaces comprising:

coating all of the exposed surfaces with a melted tallow composition; and allowing the composition to cool to form a seal thereon.

2. The method according to claim 1 wherein the composition penetrates the exposed surfaces of the mass to a depth of between about ¼ and about ¾ of an inch.

3. The method according to claim 1 wherein at least 0.4 pounds of the composition are applied per square foot of exposed surface area of the mass.

4. The method according to claim 3 wherein between about 0.4 and about 0.8 pounds of the composition are applied per square foot of exposed surface area of the mass.

5. The method according to claim 1 where between about 1½ and about 2 pounds of the composition are applied per 100 pounds of forage product.

6. The method according to claim 1 wherein the composition has a titre of between about 47 and about 49.

7. The method according to claim 1 wherein the composition has an iodine value of less than about 20.

8. A method of storing forage product in a field exposed to ambient climatic conditions, comprising:

forming the forage product in a mass; and applying a melted tallow composition to the exposed surfaces of the mass to form a sealing protective layer thereon.

9. The method according to claim 8 wherein the composition has a titre of between about 47 and about 49.

10. The method according to claim 8 wherein the composition has an iodine value of less than about 20.

11. The method according to claim 8 further comprising forming the forage product into a bale before applying the composition thereon.

12. A weather-resistant mass of forage product the exposed surfaces of which are sealed with a tallow composition forming a protective layer thereon at least ¼ inch thick.

13. The weather-resistant mass of forage product according to claim 12 wherein there is between and 1½ and 2 pounds of composition per hundred pounds of forage product.

14. The weather-resistant mass of forage product according to claim 12 wherein the composition has a titre of between 47 and 49.

15. The weather-resistant mass of forage product according to claim 12 wherein the composition has an iodine value of less than about 20.

16. The weather-resistant mass of forage product according to claim 12 wherein the mass is in the form of a bale.

* * * * *